(12) United States Patent
Valance

(10) Patent No.: US 9,486,099 B2
(45) Date of Patent: Nov. 8, 2016

(54) COOKING DEVICE

(71) Applicant: SEB SA, Ecully (FR)

(72) Inventor: Nicolas Valance, Dijon (FR)

(73) Assignee: SEB SA, Ecully (FR)

( * ) Notice: Subject to any disclaimer, the term of this patent is extended or adjusted under 35 U.S.C. 154(b) by 204 days.

(21) Appl. No.: 13/678,842

(22) Filed: Nov. 16, 2012

(65) Prior Publication Data

US 2013/0125763 A1    May 23, 2013

(30) Foreign Application Priority Data

Nov. 18, 2011   (FR) ...................................... 11 60507

(51) Int. Cl.
| | | |
|---|---|---|
| *F24C 7/08* | (2006.01) | |
| *A47J 37/00* | (2006.01) | |
| *A47J 27/00* | (2006.01) | |
| *A47J 27/62* | (2006.01) | |
| *H05B 1/02* | (2006.01) | |
| *H05B 6/00* | (2006.01) | |

(52) U.S. Cl.
CPC .................. *A47J 27/00* (2013.01); *A47J 27/62* (2013.01); *A47J 37/00* (2013.01); *F24C 7/08* (2013.01); *F24C 7/087* (2013.01); *H05B 1/0261* (2013.01); *H05B 6/00* (2013.01)

(58) Field of Classification Search
CPC .......... A47J 37/00; A47J 37/01; A47J 27/62; A47J 27/004; F24C 7/08
USPC ................. 99/332, 333, 334, 331, 335, 336; 426/523
See application file for complete search history.

(56) References Cited

U.S. PATENT DOCUMENTS

| | | | |
|---|---|---|---|
| 3,827,345 A | 8/1974 | Willson | |
| 4,568,810 A | 2/1986 | Carmean | |
| 4,649,810 A | 3/1987 | Wong | |
| 5,893,051 A | 4/1999 | Tomohiro | |
| 5,981,916 A * | 11/1999 | Griffiths et al. | ............... 219/492 |
| 8,136,442 B2 * | 3/2012 | Strutin-Belinoff et al. | ..... 99/331 |
| 8,563,059 B2 * | 10/2013 | Luckhardt et al. | ........... 426/233 |

(Continued)

FOREIGN PATENT DOCUMENTS

| | | |
|---|---|---|
| DE | 10332021 B3 | 4/2005 |
| DE | 102007031372 A1 | 1/2009 |
| DE | 102007059236 A1 | 6/2009 |
| DE | 102010016024 A1 | 9/2011 |

(Continued)

*Primary Examiner* — Reginald L Alexander
(74) *Attorney, Agent, or Firm* — Cantor Colburn LLP

(57) ABSTRACT

A control device for a cooking appliance, the cooking appliance including a cooking chamber designed to receive at least one predetermined food or a plurality of ingredients of a predetermined recipe, a heating component for heating the cooking chamber, the control device including a control unit arranged to determine at least one combination of predetermined cooking parameters as a function of at least of the specific surface area of the at least one unitary element of the at least one predetermined food or the at least one ingredient of the plurality of ingredients of the predetermined recipe inserted into the cooking chamber of the cooking appliance, the specific surface area being estimated from descriptive parameters of the at least one unitary element of the predetermined food or the at least one ingredient from among the plurality of ingredients of the predetermined recipe.

14 Claims, 6 Drawing Sheets

(56) References Cited

U.S. PATENT DOCUMENTS

| | | |
|---|---|---|
| 2008/0264269 A1* | 10/2008 | Sterzel et al. ............... 99/331 |
| 2009/0258331 A1 | 10/2009 | Do et al. |
| 2010/0057540 A1 | 3/2010 | Tanaka et al. |
| 2010/0313768 A1 | 12/2010 | Koether et al. |
| 2011/0123689 A1 | 5/2011 | Luckhardt et al. |
| 2011/0177222 A1* | 7/2011 | Calzada et al. ............. 426/523 |
| 2013/0003490 A1 | 1/2013 | Kemker et al. |

FOREIGN PATENT DOCUMENTS

| | | |
|---|---|---|
| WO | 0170087 A2 | 9/2001 |
| WO | 2004071131 A2 | 8/2004 |
| WO | 2007086707 A1 | 8/2007 |
| WO | 2011069833 A1 | 6/2011 |

* cited by examiner

COOKING DEVICE

TECHNICAL FIELD

The present invention relates to the field of culinary preparations.

BRIEF DESCRIPTION OF RELATED ART

More specifically, the present invention relates to a device for controlling a cooking appliance as well as a cooking appliance and an assembly comprising the cooking appliance and the control device.

It is known to use a control device for a cooking appliance, said cooking appliance comprising:
- a cooking chamber designed to receive at least one predetermined food or a plurality of ingredients in a predetermined recipe,
- a heating component for heating the cooking chamber, the control device comprising:
- a control unit of the heating component arranged to define a cooking cycle comprising at least one combination of predetermined cooking parameters, such as the cook time and/or cook temperature,
- a database comprising:
  - a first group of predetermined foods and/or predetermined recipes comprising a plurality of predetermined ingredients designed to be inserted into the cooking chamber of the cooking appliance, and
  - a second group of descriptive parameters for at least one predetermined food and/or the plurality of predetermined ingredients of the recipes of the first group.

In a known manner, the first group and the second group define cooking cycles prerecorded in the memory or database of the appliance.

However, these prerecorded cooking cycles do not make it possible to optimize the cooking of foods or the plurality of ingredients inserted into the cooking chamber as a function of the intrinsic characteristics of those foods, which causes approximate cooking of foods.

BRIEF SUMMARY

The present invention aims to resolve all or some of the aforementioned drawbacks.

To that end, the present invention relates to a control device for a cooking appliance comprising a control unit of the heating component arranged to determine at least one combination of cooking parameters as a function at least of the specific surface area of at least one unitary element of the at least one predetermined food or the at least one ingredient of the plurality of ingredients of the predetermined recipe inserted into the cooking chamber of the cooking appliance, said specific surface area being estimated from descriptive parameters of the at least one unitary element of the predetermined food or the at least one ingredient from among the plurality of ingredients of the predetermined recipe.

The determination of the specific surface area of at least one unitary element of at least one predetermined food inserted into the cooking chamber of the cooking appliance makes it possible to characterize that food precisely and therefore optimize its cooking.

According to one aspect of the invention, the control unit of the heating component is arranged to determine at least one combination of cooking parameters as a function of the predetermined recipe.

According to one aspect of the invention, the control unit is arranged to define a cooking cycle comprising a sequential series of combinations of predetermined cooking parameters.

This arrangement makes it possible to optimize the cooking of several foods having different cooking parameters.

According to one aspect of the invention, the control unit is arranged to determine the at least one combination of cooking parameters taking into account the type of predetermined food or the type of the at least one ingredient from among the plurality of ingredients of the predetermined recipe.

"Type of food" in particular refers to a type of meat, for example such as beef, poultry, type of vegetable, or type of starch/grain.

According to one aspect of the invention, the control device comprises:
- a database comprising:
  - a first group of predetermined foods and/or predetermined recipes comprising a plurality of predetermined ingredients designed to be inserted into the cooking chamber of the cooking appliance, and
  - a second group of descriptive parameters for at least one predetermined food and/or the plurality of predetermined ingredients of the recipes of the first group,
- a user interface comprising:
  - first means for selecting a predetermined food or a predetermined recipe from the first group of the database, and
  - second means for selecting descriptive parameters from the second group of the database of the at least one unitary element of the selected predetermined food or the at least one ingredient from among the plurality of ingredients of the selected predetermined recipe from the first group.

This arrangement makes it possible to guide the user in choosing foods or recipes to be cooked.

According to one aspect of the invention, the user interface comprises display means of the graphic type with a liquid-crystal screen.

This arrangement makes it possible to define an intuitive ergonomic interface.

According to one aspect of the invention, the first and/or second selection means comprise a rotary selection knob.

This arrangement makes it possible to reduce the number of different means to make and validate a selection as well as to reduce the time dedicated to the selection.

According to one aspect of the invention, the descriptive parameters of the at least one unitary element of the predetermined food or of the at least one ingredient from among the plurality of ingredients of the predetermined recipe comprise the shape and/or size of the unitary element.

This arrangement makes it possible to refine the calculation of the specific surface area of the at least one unitary element.

According to one aspect of the invention, the descriptive parameters of the at least one unitary element of the predetermined food or of the at least one ingredient from among the plurality of ingredients of the predetermined recipe comprise the quantity of unitary elements, in particular their total weight.

This arrangement makes it possible to refine the calculation of the specific surface area of the at least one unitary element.

According to one aspect of the invention, the descriptive parameters of the at least one unitary element of the predetermined food or of the at least one ingredient from among the plurality of ingredients of the predetermined recipe comprise the state of the at least one unitary element, in particular frozen or fresh.

This arrangement makes it possible to refine the determination of the cooking parameters.

According to one aspect of the invention, the user interface comprises third means for selecting the user's preferences from a third group of the database, in particular the cooking method, for example steam, immersion, browning, and the level of cooking, for example rare, medium, crisp, soft, the control unit being arranged to make the determination of a combination of predetermined cooking parameters also as a function of the preferences selected by the user.

This arrangement makes it possible to refine the determination of the cooking parameters as a function of the user's culinary preferences.

According to one aspect of the invention, the database comprises a fourth group of cooking cycles comprising a sequential series of predetermined combinations of predetermined cooking parameters, each predetermined combination of the series of cooking parameters being associated with possible combinations between:
- the predetermined foods or the predetermined recipes of the first group, with
- the descriptive parameters of the at least one unitary element of the predetermined foods or of the at least one ingredient from among the plurality of ingredients of the predetermined recipes of the second group, and with
- if applicable, the preferences from the third group,
- the determination of the cooking cycle by the control unit comprising selecting a cooking cycle from the fourth group as a function of the selection by the user of:
- a predetermined food or a predetermined recipe from the first group,
- descriptive parameters from the second group of the database of the at least one unitary element of the selected predetermined food or of the at least one ingredient from among the plurality of ingredients of the selected predetermined recipe from the first group, and, if applicable,
- preferences selected from the third group.

This arrangement makes it possible to establish optimized cooking cycles for cooking the foods.

According to one aspect of the invention, the control device includes means for connecting to a data source comprising an update for the first group and/or the second group and/or the third group and of the cooking cycles from the fourth group.

The present invention also relates to a cooking appliance comprising a cooking chamber designed to receive at least one predetermined food or a plurality of ingredients of a predetermined recipe, a heating component for heating the cooking chamber, and a control device as previously described.

The present invention also relates to a cooking assembly comprising a cooking appliance having a cooking chamber designed to receive at least one predetermined food or a plurality of ingredients of a predetermined recipe, a heating component for heating the cooking chamber, and first communication means on the one hand, and a control device as previously described on the other hand, said device also comprising second communication means arranged to communicate with the first wireless communication means of the cooking appliance.

Advantageously, the first communication means and the second communication means are of the wireless type.

According to one aspect of the invention, the control device is a smart phone.

The present invention also relates to a method for cooking a predetermined food or at least one ingredient from among a plurality of ingredients of a predetermined recipe in a cooking appliance as previously described, comprising a step of determining at least one combination of predetermined cooking parameters as a function of the specific surface area of the at least one unitary element of the at least one predetermined food or of the at least one ingredient from among the plurality of ingredients of the predetermined recipe inserted into the cooking chamber of the cooking appliance, said specific surface area being estimated from descriptive parameters of the at least one unitary element of the predetermined food or of the at least one ingredient from among the plurality of ingredients of the predetermined recipe.

This method makes it possible to determine a specific combination of cooking parameters applied to the predetermined food or to the plurality of ingredients of the predetermined recipe.

According to one embodiment of the method, the method comprises the following steps:

(a): selecting a predetermined food or a predetermined recipe from the first group of the database using first selection means, (b): selecting, from a second group of the database, descriptive parameters of the at least one unitary element of the predetermined food or the at least one ingredient from among the plurality of ingredients of the predetermined recipe selected from the first group using second selection means, (c): carrying out the step of the method previously described.

This method makes it possible to guide the user by offering said user a selection of foods or recipes to be cooked in advance.

According to one embodiment of the method for cooking a plurality of ingredients of a predetermined recipe, the method also comprises the following steps:

(d): starting a predetermined cooking cycle comprising a sequential series of combinations of predetermined cooking parameters, (e): indicating one or more first ingredients of the selected recipe to be inserted into the cooking chamber as a function of the selected descriptive parameters, (f): inserting one or more first ingredients of the selected recipe into the cooking chamber according to the selected descriptive parameters, (g): applying a first sequence of the sequential series of the predetermined combination of the cooking parameters comprised in the predetermined cooking cycles so as to precook said first ingredient(s).

According to one embodiment of the method, the method also comprises the following steps:

(h): sequentially indicating one or other ingredient(s) of the selected recipe to be inserted into the cooking chamber as a function of the selected descriptive parameters, and (i): inserting the other ingredient(s) indicated in the selected recipe into the cooking chamber as a function of the selected descriptive parameters, (j): applying another sequence of the sequential series of the predetermined combination of cooking parameters comprised in the cooking cycle so as to cook the ingredient(s) already located in the cooking chamber and said other ingredient(s), (k): if applicable, restarting at step of sequentially indicating one or other ingredient(s) of the selected recipe to be inserted into the cooking chamber as a function of the selected descriptive parameters until all of the foods in the recipe have been inserted and the last sequence of the sequential series of the predetermined combination of cooking parameters of the predetermined cooking cycle has been completed.

This method makes it possible to assist a user in preparing a recipe comprising several ingredients cooked differently to indicate to the user which foods should be inserted into the cooking chamber and at what times.

BRIEF DESCRIPTION OF THE DRAWINGS

In any event, the invention will be well understood using the following description, in reference to the appended diagrammatic drawing showing, as a non-limiting example, an appliance and/or a control device according to the invention as well as the method for cooking a recipe.

DETAILED DESCRIPTION

Figure 1:
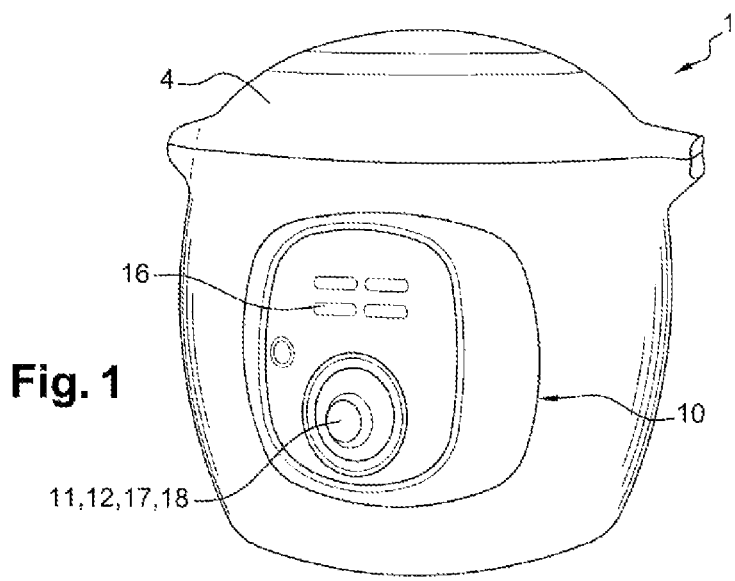
FIG. 1 shows an overall view of a cooking appliance according to a first embodiment of the invention.
Figure 2:
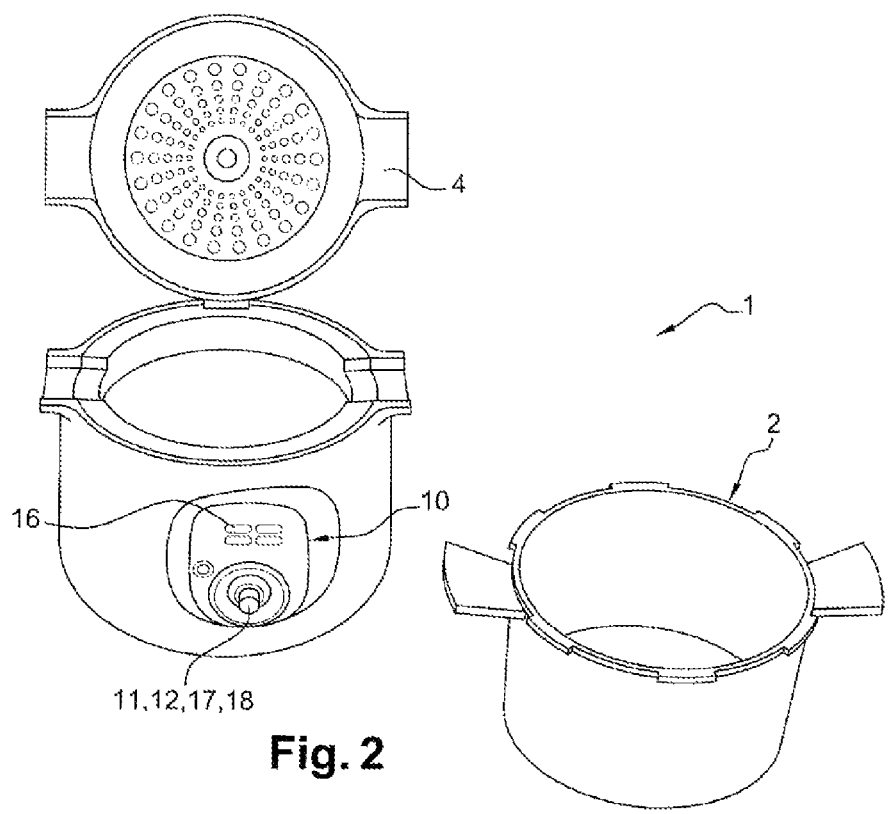
FIG. 2 shows an exploded view of the cooking appliance of FIG. 1.
Figure 3:
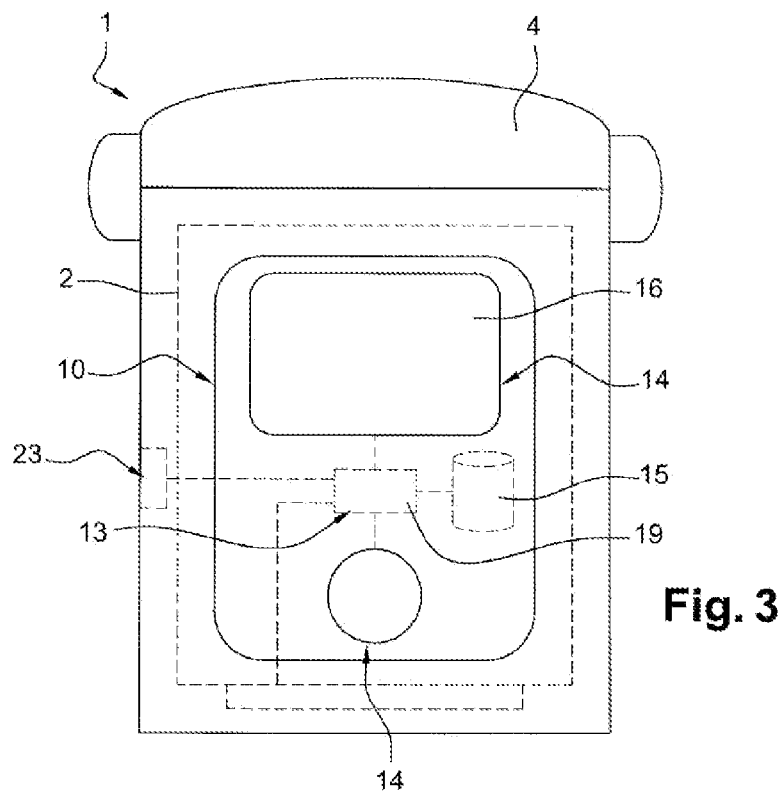
FIG. 3 is a block diagram of the cooking appliance of FIGS. 1 and 2.

As illustrated in FIGS. 1 to 3, a cooking appliance 1 comprises a cooking chamber 2, also called a vat 2, designed to receive at least one predetermined food $A_i$ or a plurality $\Sigma_x A_i$ of predetermined foods of a recipe $R_j$.

A predetermined food $A_i$ is a food or ingredient of a recipe that may be cooked individually, consumed by itself, and that may for example be broken down into several types of fish or meat such as beef, pork or lamb, or vegetables such as artichokes, carrots, or rice or grains such as wheat.

A recipe $R_j$ represents a sum $\Sigma_x A_i$ of predetermined foods or ingredients, for example a goulash prepared from cubed beef, minced onions, oil, minced green pepper, crushed tomatoes, and peas.

Figure 6:
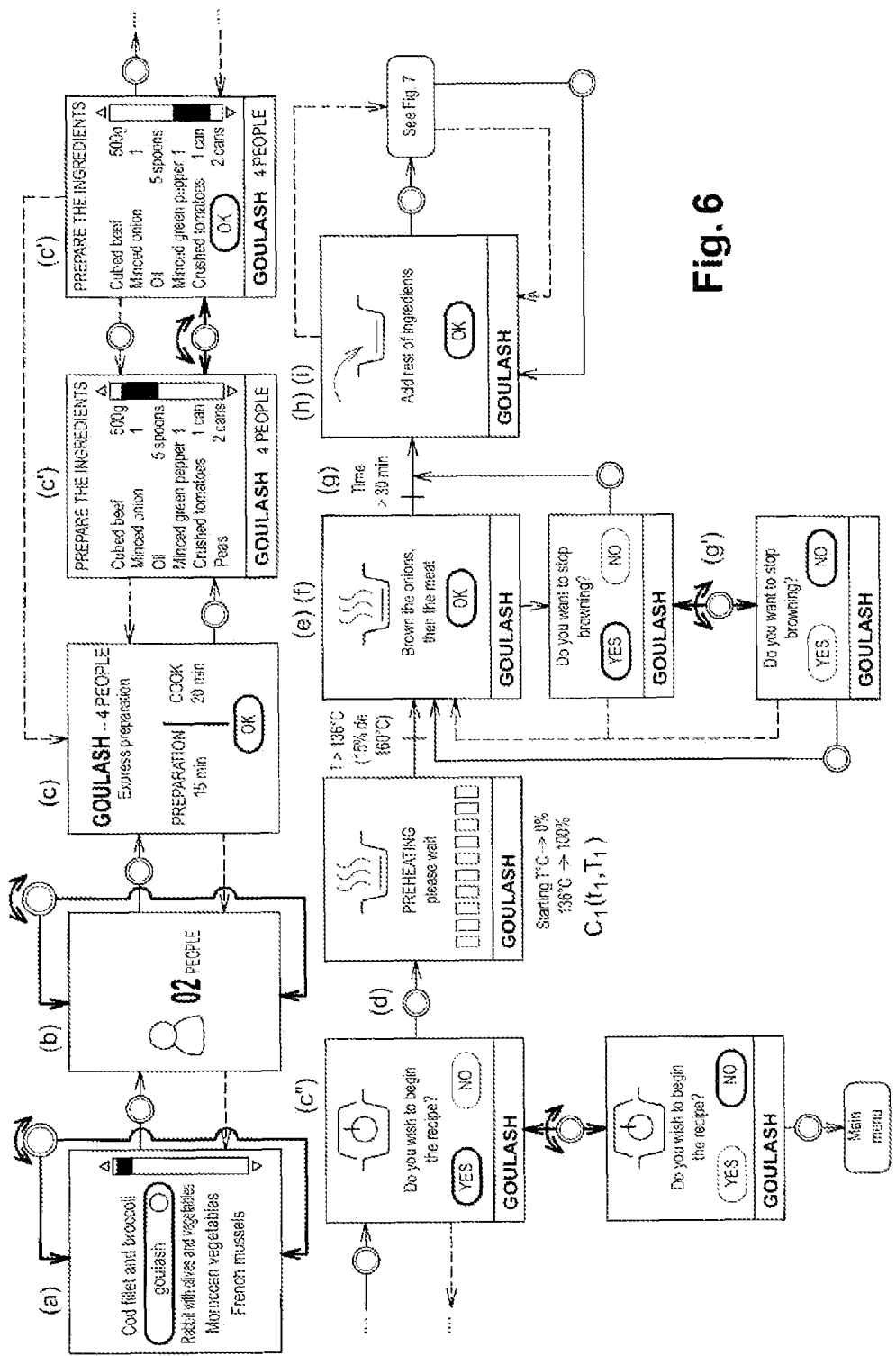
FIGS. 6 to 8 illustrate steps of a method for cooking a plurality of ingredients of a recipe according to one preferred embodiment of the invention.
Figure 7:
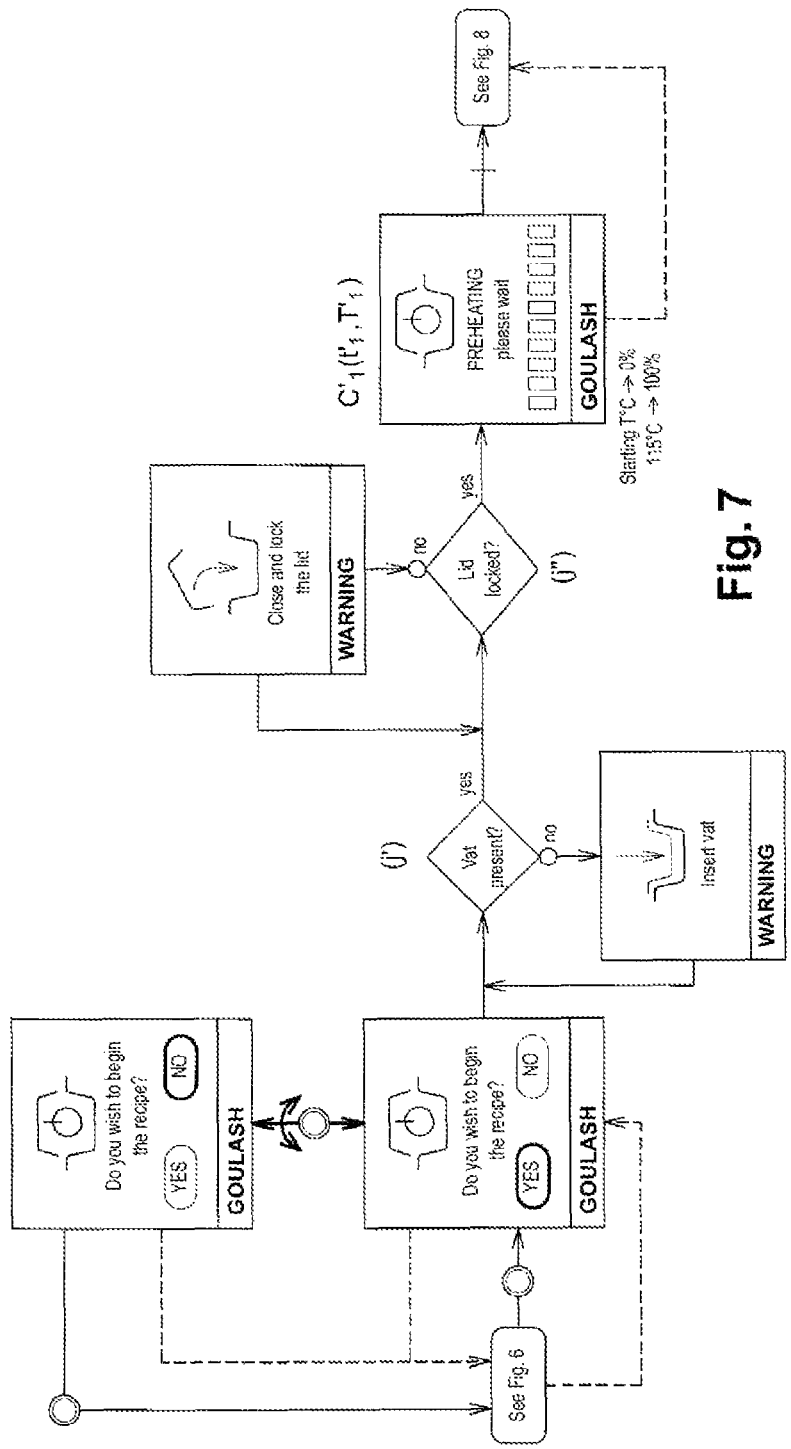
Figure 8:
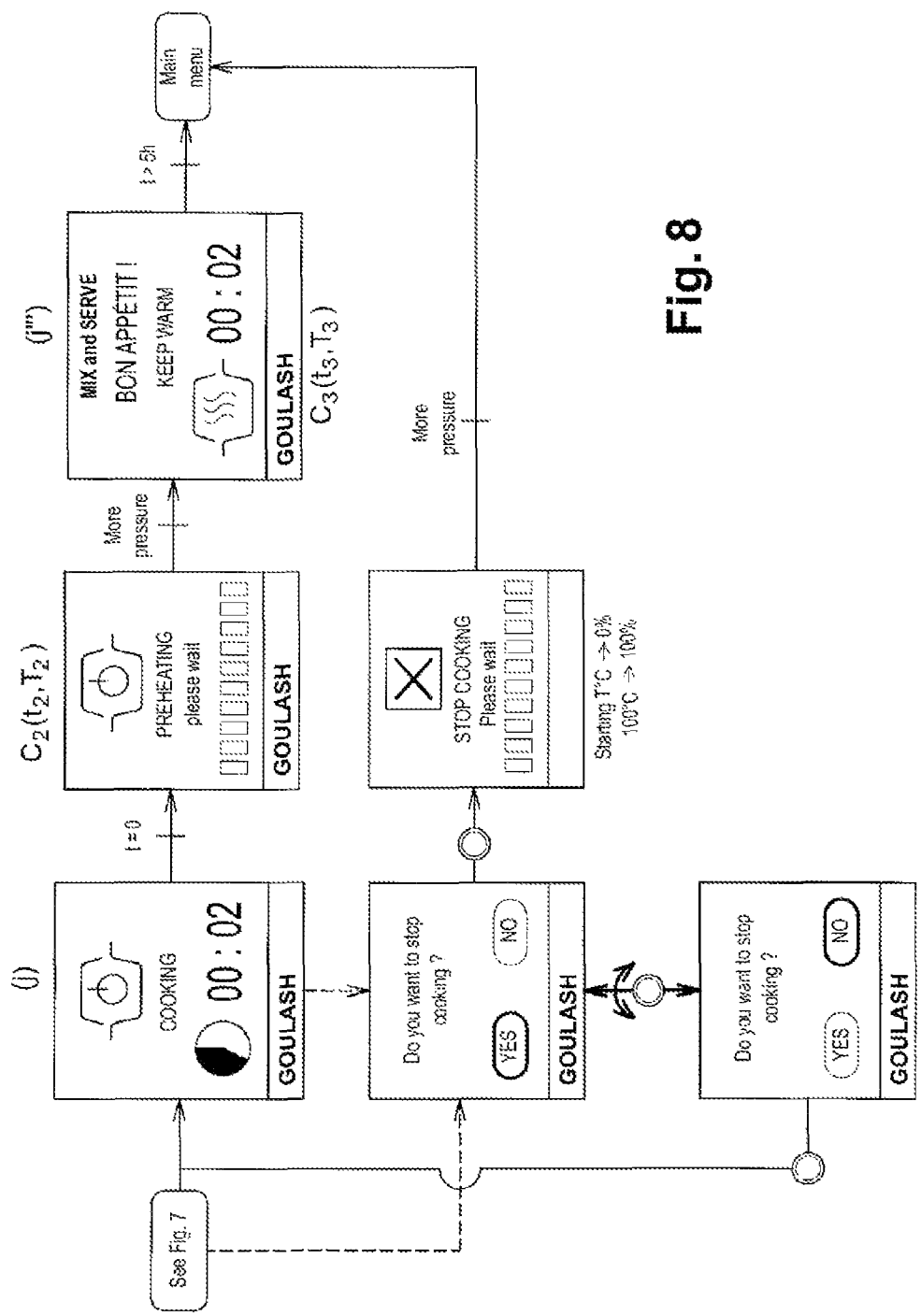

The steps of a method for cooking the plurality of ingredients of the recipe are illustrated in FIGS. 6 to 8.

The cooking appliance 1 also comprises a heating component 3 for heating the cooking chamber 2.

This heating component 3 comprises a heating resistance arranged below the vat 2 so as to heat the latter part by conduction as well as convection.

In the embodiment shown in FIGS. 1 to 3, the cooking appliance 1 comprises a control device 10.

This control device 10 comprises a control unit 13 of the heating component 3 arranged to define a cooking cycle $C_i$ comprising a sequential series of at least one predetermined combination $c_i$ of predetermined cooking parameters $t_i$, $T_i$, such as the cook time t and the cook temperature T.

A cooking cycle therefore assumes the form:

$$C_i = \{(t_1, T_1); (t_2, T_2); \ldots ; (t_n, T_n)\}$$

where each binomial represents a predetermined combination sequence $c_i$ of cooking parameters $t_i$, $T_i$ and where n is the number of sequences of the cooking cycle $C_i$.

Of course, the cooking cycle $C_i$ may have only a single sequence $c_i$ of predetermined cooking parameters ti, Ti, in which case the control unit 13 is arranged to determine a single combination of predetermined cooking parameters directly.

Furthermore, the predetermined cooking parameters $t_i$, $T_i$ and the number thereof are provided here as examples. Thus, other parameters could be used without going beyond the scope of the invention.

The cook time t and the cook temperature T depend directly on the supply of the heating component 3, and the temperature T, which is directly affected by the pressure P, also depends on the presence of the lid 4 of the cooking appliance 1 as well as the altitude at which the cooking appliance 1 is used.

A pressure difference P inside the vat 2 due to altitude modifies the cook times and therefore invalidates the cooking cycles $C_i$.

In order to preserve the validity of the cooking cycles Ci, the temperature may be monitored by a temperature regulating device, for example using a temperature sensor T placed in the lid 4, which monitors the cooking to ensure that it takes place at the correct temperature T.

Furthermore, the control device 10 has a database 15 comprising a first group G1 of predetermined foods $A_i$ and/or predetermined recipes $R_j$ comprising a plurality $\Sigma_x A_i$ of predetermined ingredients designed to be inserted into the cooking chamber 2 of the cooking appliance 1, and a second group G2 of descriptive parameters X of the at least one unitary element of a predetermined food $A_i$ and/or of the at least one ingredient from among the plurality $\Sigma_x A_i$ of predetermined ingredients of the recipes $R_j$ from the first group G1.

A non-exhaustive list of predetermined foods $A_i$ from the first group G1 and a non-exhaustive list of descriptive parameters X of the second group G2 are shown as an example in table 1, appended to the end of the description.

This control device 10 also comprises a user interface 14.

This user interface 14 comprises display means 16 of the graphic type of a liquid crystal screen in order to improve the ergonomics of the cooking appliance 1.

This liquid crystal screen may also be a touchscreen.

This user interface 14 also comprises first selection means 11 for selecting a predetermined food $A_i$ or a predetermined recipe $R_j$ from the first group G1 of the database 15, and second selection means 12 for selecting descriptive parameters X from the second group G2 of the database 15 of the selected predetermined food $A_i$ or the at least one ingredient from among the plurality $\Sigma_x A_i$ of ingredients of the predetermined recipe $R_j$ selected from the first group G1.

In the described example, the first and second selection means 11, 12 are combined and comprise a rotary selection knob 17 making it possible to move a cursor or highlight a choice by rotating the knob and validate that choice by exerting pressure in a direction normal to a plane in which the rotation of the knob 17 fits.

According to one essential feature of the invention, the control unit 13 makes the determination of at least one combination $c_i$ of predetermined cooking parameters $t_i$, $T_i$ as a function of the specific surface area of the at least one unitary element of the at least one predetermined food $A_i$ or of the plurality of ingredients of the predetermined recipe $R_j$ inserted into the cooking chamber 2 of the cooking appliance 1, said specific surface area being estimated from descriptive parameters X of the at least one unitary element of the predetermined food $A_i$ or of the at least one ingredient from among the plurality $\Sigma_x A_i$ of ingredients of the predetermined recipe $R_j$.

In the present embodiment, the control unit 13 determines a cooking cycle $C_i$ comprising a sequential series of combinations $c_i$ of predetermined cooking parameters $t_i$, $T_i$.

To that end, the control unit 13 comprises processing means 19 exchanging data with the database 15, processing the exchanged data with the user interface 14, i.e. selection means 11, 12 and display means 16.

The specific surface area refers to the surface area scaled to the weight or volume of an object.

The cooking is the result of an energy/heat contribution to a food. Mastering the cooking of the food (cook time) therefore requires mastering the heat transfer with that food. This may be done in several ways:
  convection,
  conduction,
  radiation.

In the case of a cooking appliance 1 according to the invention, the transfer of energy is essentially done by conduction and convection.

The ratio between conduction and convection depends directly on the type of recipe made. For example, submerged cooking causes convection phenomena between a liquid and solid; steam cooking causes a transfer of energy due to the change of phase in addition to the convection and conduction phenomena; cooking by contact with the bottom of the cooking chamber 2 without liquid primarily causes cooking by conduction.

Nevertheless, the transfer of energy at the center of a unitary element of a predetermined food $A_i$ is done solely by conduction.

For each of these cooking modes, the quantity of energy Q transferred to the food, and therefore indirectly the time necessary to cook that food, depends on the specific surface area of that food.

In the case of a conduction:

$$\dot{Q} = -K \cdot A_{nx} \frac{dT}{dx}$$

where:
Q is the flow of heat (reads "Q point") and is expressed in watts;
K is the heat conductivity of the material determined experimentally (in $W \cdot m^{-1} \cdot K^{-1}$); this variable depends on the predetermined food $A_i$ in question (type of meat, type of vegetable, etc.);
$A_{nx}$ is the surface perpendicular to the heat flow (normal to the considered axis x); this variable is directly related to the specific surface area (the smaller the unitary elements, the larger $A_{nx}$ will be for a same food mass);
T is the temperature (in Kelvin);
x is the considered axis.

In the case of a convection, the flow of heat is equal to $$\Phi = h\, S(T_S - T_\infty)$$

Where:
$\Phi$ is the heat flow (in W);
h is the heat transfer coefficient (in $W \cdot m^{-2} \cdot K^{-1}$); with $$h = \frac{\Delta Q}{A \cdot \Delta T \cdot \Delta t}$$

where:
$\Delta Q$ is the transferred energy (in $J \leftrightarrows W \cdot s \sqrt{kg \cdot m^2 \cdot s^{-2}}$);
A is the exchange surface (in $m^2$);
$\Delta T$ is the temperature difference on either side of the exchange surface (in K or ° C.);
$\Delta t$ is the time interval (in s);
S is the surface area of the food in question (in $m^2$);
$T_S$ is the surface temperature of the food at the boundary of the two mediums (in K or ° C.);
$T_\infty$ is the temperature at the center of the considered food (in K or ° C.).

As in the case of conduction, the specific surface area of the unitary elements of the predetermined food $A_i$ has a major influence on the quantity of energy that can be transferred to the unitary element.

Once this energy is transferred to the surface of the unitary element, the energy is transferred by solid/solid conduction toward the center of the unitary element. This transfer is greatly affected by the heat conductivity of the considered food, and therefore by the type of the considered food.

The primary physical quantities influencing the heat transfer are therefore:
  the heat conductivity, which is constant for a predetermined type of food $A_i$, which may therefore be stored permanently in the database 15 and is not among the descriptive parameters X entered by the user into the cooking appliance 1,
  the specific surface area dependent on the type of cut of the food, which is part of the descriptive parameters X provided by the user of the cooking appliance 1, and
  the total quantity of the predetermined food $A_i$ inserted into the cooking chamber 2, which is also part of the descriptive parameters X entered by the user of the cooking appliance 1.

This last quantity may be entered in various ways, for example in the case of the selection of a recipe, the selection of a number of people N for whom the recipe is to be cooked may suffice to deduce the total quantity of a predetermined ingredient used in recipe, the quantity of ingredient for one person being standardized.

The operation of the user interface 14 proposing to enter the descriptive parameters X of the predetermined type of food $A_i$ inserted into the cooking chamber 2, then the shape and/or size of that predetermined food $A_i$ by specifying the type of cut, is therefore crucial in identifying the predetermined cooking cycle $C_i$.

It has been demonstrated experimentally that it is difficult to define a correct cooking time t for a large number of varied foods or ingredients $A_i$ without knowing at least those two descriptive parameters X.

Once a recipe $R_i$ is chosen, certain descriptive parameters X such as the shape and/or size of the food may be preselected, in particular the shape defined by the type of cut of the ingredient, for example for a meat, or certain vegetables such as carrots that may be cut into round pieces, but also its size, small or large, for example for vegetables such as peas or beets.

The cooking time of several foods or ingredients of a recipe according to their type of cut and quantity are provided as an example in table 3 in the annex at the end of the description.

The control unit 13 of the heating component 3 is also arranged to determine at least one combination $c_i$ of cooking parameters $t_i$, $T_i$ as a function of the predetermined recipe $R_i$ determined by the user.

It is thus that in table 3, the cooking time $t_i$ of the predetermined quantity of a predetermined ingredient according to a first predetermined cut type may be longer than the cooking time for a same quantity of that same ingredient but for a second cut type creating a smaller specific surface area of the ingredient than that of the first cut type.

In table 3, this configuration is in particular illustrated by the pieces of beef which, in one particular recipe incorporating beef as an ingredient, required 35 minutes of simmering, whereas a recipe incorporating roast beef having a smaller beef specific surface area than when cut into pieces requires a cooking time of only 22 minutes, such that the roast beef remains rare.

To prepare a recipe, the user then only needs to enter the number of people N for whom the recipe is to be prepared so as to be able to calculate the total quantity of the predetermined ingredient $A_i$ to be inserted into the cooking chamber 2.

The state of the predetermined ingredient $A_i$ i.e. whether it is fresh or frozen, may also be entered into the descriptive parameters X.

Preheating or an extended cook time as a function of the total mass of the predetermined ingredient Ai inserted into the cooking chamber 2 and the state of the predetermined ingredient Ai may also be considered.

Additionally, the type of heat transfer by immersion, steam, or contact is also important, as well as the desired degree of cooking, for example rare, medium, crunchy, soft.

This information nevertheless represents the user's preferences Pref, and therefore not descriptive parameters X that intrinsically describe at least one unitary element of a food or a predetermined ingredient $A_i$.

These preferences Pref are collected in a third group G3 of the database 15 and selected by the user using third selection means 18 which, in the present embodiment, are combined with the other two selection means 11, 12.

A non-exhaustive list of preferences of the third group G3 is shown as an example in table 1, appended at the end of the description.

The control unit 13 then takes these preferences Pref into account when incrementing the cooking cycle t, T, for example by applying a same sequence of the cooking cycle several times.

The cooking cycles $C_i$ are determined from results of tests extrapolated to cover all of the combinations of the descriptive parameters X described as well as potentially the user's preferences. They are defined and recorded permanently in a database 15 and cannot be modified when manufacturing the cooking appliance 1.

These cooking cycles $C_i$ comprising a sequential series of at least one predetermined combination $c_i$ of predetermined cooking parameters $t_i$, $T_i$ form a fourth group G4 in the database 15.

This fourth group G4 is shown for information in table 1, appended to the end of the description.

Thus, each predetermined combination $c_i$ of the series of predetermined cooking parameters $t_i$, $T_i$ is associated with possible combinations between:
  the predetermined foods $A_i$ or the predetermined recipes $R_i$ of the first group G1, with
  the descriptive parameters X of at least one unitary element of the predetermined foods $A_i$ or of the at least one ingredient $A_i$ among the plurality of ingredients of the predetermined recipes $R_i$ of the second group G2.

The determination of the cooking cycle $C_i$ by the processing means 19 of the control unit 13 then selecting a predetermined cooking cycle $C_i$ from the fourth group G4 as a function of the selection by the user of:
  a predetermined food $A_i$ or a predetermined recipe $R_i$ from the first group G1,
  descriptive parameters X from the second group G2 of the database 15 of the at least one unitary element of the selected predetermined food $A_i$ or of the at least one ingredient from among the plurality of ingredients of the predetermined recipe $R_i$ selected from the first group G1.

The linking of certain sequences of predetermined combinations $c_i$ of the cooking cycle $C_i$ may depend on the preferences Pref of the user selected from the third group G3.

This linking is shown by arrows positioned between each of the elements of table 1 shown in the appendix at the end of the description.

This fourth group G4 as well as the other three lists G1, G2, G3 may be updated from a remote server to which the device connects using connection means (not shown), for example means for connecting to a remote server via the Internet.

Figure 4:
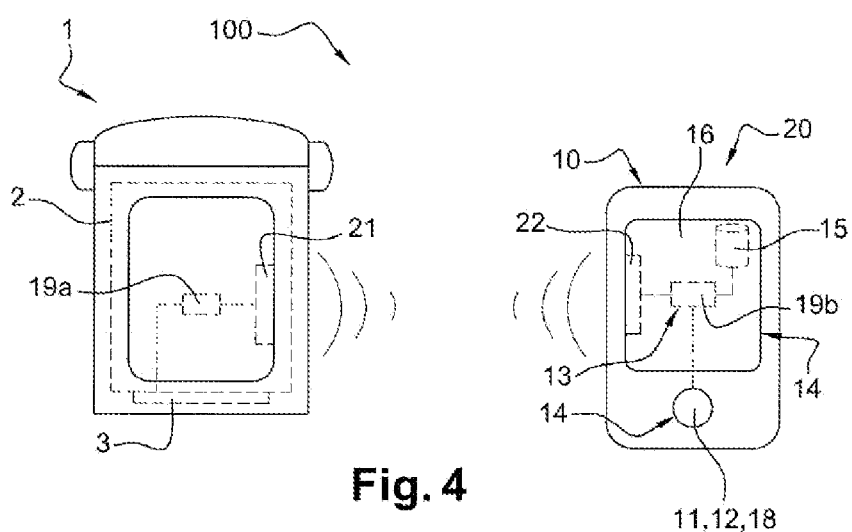
FIG. 4 is a block diagram of a cooking appliance according to the invention.

In a second embodiment illustrated in FIG. 4, the control device 10 is not incorporated into the cooking appliance 1.

The control device 10 nevertheless communicates with the cooking appliance 1 respectively via the first communication means 21 and second communication means 22, which are preferably wireless.

In this embodiment, the control device 10 and the cooking appliance 1 form a cooking assembly 100.

In this embodiment, the control device 10 may for example be a smart phone 20.

The processing means 19 can be broken down into a first data processing means 19a positioned in the cooking appliance 1 so as to process the data passing through the first communication means 21 and order power to the heating component 3, and a second data processing means 19b that may be combined with data processing means of the smart phone and processing the data passing through the second communication means 22, the database 15, and the user interface, i.e. the selection means 11, 12, 13 and the display means 16.

The present invention also relates to a method for cooking a predetermined food $A_i$ or a plurality of ingredients of a predetermined recipe Ri in a cooking appliance 1 as previously described in either of the two embodiments.

Figure 5:
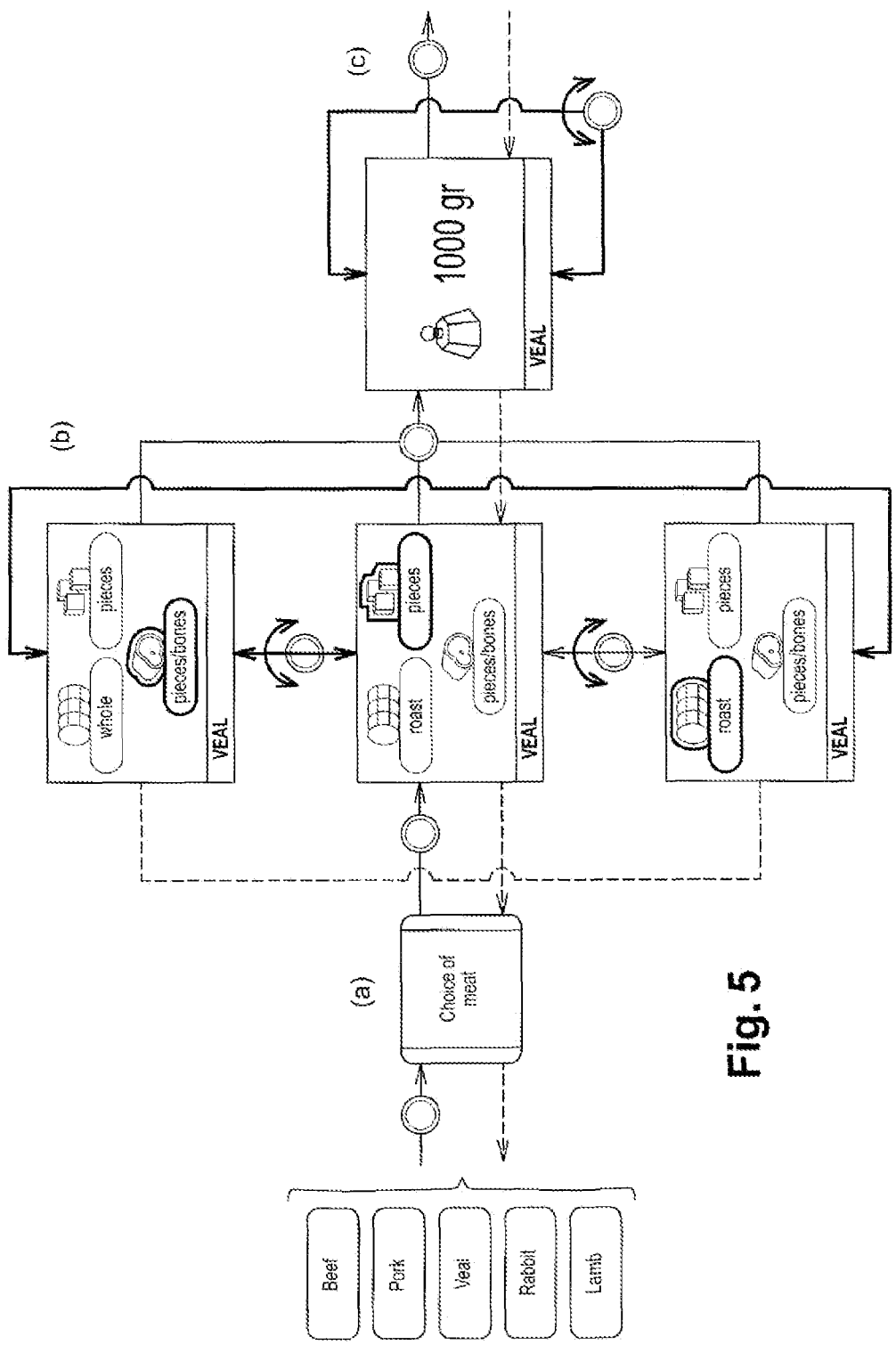
FIG. 5 illustrates the steps of a method for cooking the food according to the invention.

FIG. 5 illustrates the method for cooking roast veal according to one preferred embodiment of the invention.

In a first step, the user begins by selecting the veal meat from the first group G1 of the database 15 using the first selection means 11.

In a second step, the user selects, from the second group G2, descriptive parameters X of at least one unitary element of the veal meat selected from the first group G1 using the second selection means 12.

In the present example, these parameters relate to the type of cut of the meat, in this case a roast, as well as its quantity, here 1000 g.

In a third step, the control unit 13 determines cooking parameters $t_i$, $T_i$ as a function of the specific surface area of the roast veal, said specific surface area being estimated from the mass of the roast veal.

FIGS. 6 to 8 illustrate the steps for preparing a goulash recipe $R_{goulash}$ according to one embodiment of the method for cooking a plurality of ingredients of a recipe, from a cooking appliance 1 according to the invention.

The ingredients necessary to prepare such a recipe $R_{goulash}$, the descriptive parameters X to be taken into account for its preparation, as well as a user's preferences are included in a second table appended to the end of the description.

This method comprises a first step of selecting a predetermined recipe $R_i$ from the first group G1 of the database using the first selection means 11.

To that end, the display means 16 show the user a list of recipes the user can navigate to select the recipe he wishes to cook.

The list of recipes is navigated by rotating the rotary selection knob 17, while a choice is validated by exerting pressure in a direction normal to a plane in which the rotation of the knob 17 occurs.

In the illustrated example, the user chooses to cook a goulash recipe $R_{goulash}$.

A second screen is then displayed on the display means 16, asking the user to select the number of people N for whom he wishes to cook the recipe $R_{goulash}$.

The selection constitutes a second step in which the user selects, from the second group G2, descriptive parameters X of at least one ingredient from among the plurality of ingredients of the predetermined recipe $R_{goulash}$ selected in the first group G1 using the second selection means 12.

Here, the second selection means 12 are combined with the first selection means 11, and comprise the rotary selection knob 17.

The descriptive parameter X on the plurality of ingredients of the selected predetermined recipe $R_{goulash}$ relates to the number of people N for whom the predetermined recipe $R_{goulash}$ is being prepared.

This number of people N is used to determine the total quantity of predetermined ingredients to be inserted into the cooking chamber 2.

In a third step, the control unit 13 then determines a cooking cycle $C_{goulash}$ comprising a sequential series of predetermined combination $c_i$ of the cooking parameters $t_i$, $T_i$ as a function of the specific surface area of the at least one unitary element of the predetermined ingredient(s) $A_i$ inserted into the cooking chamber 2 of the cooking appliance 1, said specific surface area being estimated from the selection of the predetermined recipe $R_{goulash}$ in the first group G1 of the database 15, and the selection from the second group G2 of the descriptive parameters X of the at least one ingredient from among the plurality of ingredients of the selected predetermined recipe $R_{goulash}$.

For information, the control unit 13 indicates, on the display means 16, an estimated preparation time as well as the predetermined cooking time corresponding to the sum of the times of all of the sequences of predetermined combinations $c_i$ of the cooking cycle $C_{goulash}$.

A first sub-step displays, on the display means 16, the ingredients $A_i$ necessary for the recipe $R_{goulash}$ and their quantity for the selected number of people N and the preselected type of cut, for example cubed beef.

The user can scroll through the list of ingredients using the rotary selection knob 17.

A second sub-step requests confirmation from the user that he wishes to prepare this recipe $R_{goulash}$ after he has examined the ingredients $A_i$ to be used.

A negative response returns the user to a main menu from which he can select a new recipe $R_j$.

A positive response leads to a fourth step of the cooking method comprising starting the cooking cycle $C_{goulash}$, in particular starting the first sequence of predetermined combination $c_1$ of that cycle $C_{goulash}$.

The first predetermined combination sequence $c_1$ of that cycle $C_{goulash}$ corresponds to preheating the cooking chamber 1 according to the cooking parameters $t_1$, $T_1$ with $t_1$ equal to 30 minutes, $T_1$ equal to 136° C. corresponding to a temperature making it possible to brown the first ingredients of the recipe $R_{goulash}$, at atmospheric pressure $P_1$ given that the cooking appliance 1, at this stage of the recipe $R_{goulash}$, does not have a lid 4 on the cooking chamber 2.

In a fifth step, the display means 16 indicate the first ingredients of the goulash recipe $R_{goulash}$ to be inserted into the cooking chamber 2, in this case the minced onion, then the cubed meat, the total quantities of which are determined as a function of the selected descriptive parameters X, in this case for four people.

In a sixth step, the user then inserts these first ingredients of the goulash recipe $R_{goulash}$.

The seventh step comprises applying the first predetermined combination sequence $c_1$, i.e. waiting until the end of the predetermined time in the predetermined combination $c_1$ forming that first sequence in order to precook or brown said first ingredients.

In parallel to the seventh step, during browning of the meat and onions, the control unit 13 performs a sub-step by displaying a request on the display means 16 to the user asking the user to indicate a preference Pref regarding the browning of said first ingredients.

In order to orient the user's preferences, this cooking preference Pref is preselected for this recipe $R_{goulash}$ from the third group G3 of the database 15.

The request comprises determining whether the user wishes to continue browning the meat and onions.

If the user responds yes, the control unit 13 will reiterate the first predetermined combination sequence $c_1$ of the cooking cycle $C_{goulash}$.

The reiteration number is nevertheless defined so as not to exceed maximum time of 30 minutes.

If the user responds no, the cooking method will wait until the end of the time indicated in the first predetermined combination sequence $c_1$ before moving on to an eighth step.

The eighth step comprises sequentially indicating one or more ingredients of the selected recipe $R_{goulash}$ to be inserted into the cooking chamber as a function of the selected descriptive parameters, in this case as a function of the number of people N.

In the presented goulash recipe $R_{goulash}$, the other ingredients comprise the rest of the ingredients.

In other recipes, this step may comprise indicating only a single ingredient.

This eighth step naturally leads to a ninth step comprising inserting the rest of the ingredients into the cooking chamber 2.

In a tenth step, the control unit 13 applies another predetermined combination sequence $c_2$ of the cooking cycle $C_{goulash}$ whereof the predetermined cooking parameters $t_2$, $T_2$ make it possible to cook the ingredients already found in the cooking chamber 2 and the rest of the ingredients added at a later time.

However, at this stage of the method, the lid 4 of the cooking device 1 is still not closed, which has allowed the rest of the foods to be inserted into the cooking chamber 2.

The control unit 13 then first sends a series of requests to the user, intended to prepare the cooking chamber 2 for the cooking parameters of the new predetermined combination sequence $c_2$ of the cooking cycle $C_{goulash}$.

The first of these requests, constituting a sub-step, comprises verifying the presence of the vat 2.

If the vat 2 is not present, the control unit 13 sends a warning to the user via the display means 16 so as to indicate to the user that he must insert the vat 2.

If the vat 2 is present, the control unit 13 then verifies the closing and locking of the lid 4, which leads to a second request, constituting a second sub-step.

If the lid is not closed and locked, the control unit 13 sends an alert to the user via the display means 16 so as to indicate to the user that he must close and lock the lid.

If the lid is closed and locked, the control unit 13 starts a new predetermined combination $c_1$ of the cooking cycle $C_{goulash}$ corresponding to another preheating according to the cooking parameters $t_{1'}$, $T_{1'}$, with $T_{1'}$ equal to 115° C.

At the end of preheating, the control unit 13 applies the new predetermined combination $c_2$ of the cooking cycle $C_{goulash}$.

At the end of the cooking time indicated in the predetermined combination sequence $c_2$ of the cooking cycle $C_{goulash}$, a sub-step (j''') comprising keeping the contents of the cooking chamber 2 warm may potentially be done by starting a new predetermined combination $c_3$ of the cooking cycle $C_{goulash}$.

The cooking method also includes, if necessary, an eleventh step comprising restarting the method from the eighth step until all of the foods of the recipe have been inserted and the last sequence of the predetermined cooking cycle $C_i$ is complete.

In the case of the recipe $R_{goulash}$, this step is not applied, since the recipe $R_{goulash}$ only includes two insertion phases, and therefore indications of ingredients to be inserted into the cooking chamber 2.

Lastly, the cooking method may comprise additional steps comprising asking the user whether he wishes to continue developing the recipe.

These requests may for example be made at the end of each predetermined combination cycle $c_i$ of the cooking cycle $C_i$.

The device also comprises an interruption means allowing the user to interrupt the development of his recipe at any time.

The request from the user may be triggered by alert means 23 controlled by the control unit 13, for example intervention beeps in the case of a first embodiment shown in FIGS. 1 to 3, or existing vibrating or sound means in the case of the second embodiment shown in FIG. 4.

The various embodiments outlined above of course are only example embodiments of the invention as defined by the appended claims. Alternatives of these various embodiments may be considered and the various embodiments described may be combined easily by one skilled in the art.

ANNEXES

TABLE 1

| G1 | | | |
|---|---|---|---|
| Type of food or recipe | Food or ingredient → | Type of cut or packaging | State of the food |
| meat | beef | pieces | Fresh |
| | pork poultry | roast pieces | Frozen |
| fish | fish | with bones filet steaks slice | |
| vegetable | carrot zucchini | whole half | |
| | | cubed minced crushed N/A | |

| Quantity | |
|---|---|
| $1 < N < 6$ | weight |
| N? | P? |
| | ↓ |
| | G3 |
| | Preferences |
| Cooking method | Degree of cooking |
| steam immersion bottom of vat | rare medium browned |
| | ↓ |
| | G4 |
| | cooking cycles Ci ti, Ti, |

TABLE 2

| G1 | | | | G2 | | G3 | |
|---|---|---|---|---|---|---|---|
| | | | | | Quantity | Preferences | |
| Type of food or recipe | Food or ingredient | Type of cut or packaging | Food state | number of people | weight | Cooking mode | Cooking level |
| goulash | beef | cubed | Fresh | 4 people | 500 g | bottom of vat | browned |
| | onion | minced | Fresh | | 1 | | |
| | oil | N/A | Fresh | | 5 spoons | | |
| | green pepper | minced | Fresh | | 1 | | |
| | tomato | crushed | Fresh | | 1 can | | |
| | peas | N/A | Fresh | | 2 cans | | |

TABLE 3

| Food | Type of cut | Quantity (in g) | Cook time (in min.) |
|---|---|---|---|
| beef | Pieces | 400 | 35 |
| | | 500 | 35 |
| | | 600 | 35 |
| | | 700 | 35 |
| | | 800 | 35 |
| | | 900 | 35 |
| | | 1000 | 35 |
| | Roast | 400 | 17 |
| | | 500 | 17 |
| | | 600 | 19 |
| | | 700 | 19 |
| | | 800 | 21 |
| | | 900 | 21 |
| | | 1000 | 22 |
| | Pieces with bone | 400 | 30 |
| | | 500 | 32 |
| | | 600 | 34 |
| | | 700 | 37 |
| | | 800 | 40 |
| | | 900 | 42 |
| | | 1000 | 45 |
| pork | Pieces | 400 | 10 |
| | | 500 | 12 |
| | | 600 | 13 |
| | | 700 | 14 |
| | | 800 | 15 |
| | | 900 | 16 |
| | | 1000 | 17 |

TABLE 3-continued

| Food | Type of cut | Quantity (in g) | Cook time (in min.) |
|---|---|---|---|
| | Pieces with bone | 400 | 10 |
| | | 500 | 11 |
| | | 600 | 12 |
| | | 700 | 13 |
| | | 800 | 14 |
| | | 900 | 15 |
| | | 1000 | 16 |
| | Roast | 400 | 28 |
| | | 500 | 32 |
| | | 600 | 35 |
| | | 700 | 38 |
| | | 800 | 38 |
| | | 900 | 40 |
| | | 1000 | 40 |
| . . . | . . . | . . . | . . . |
| poultry | whole | 1000 | 20 |
| | | 1200 | 21 |
| | | 1300 | 23 |
| | | 1400 | 24 |
| | | 1500 | 25 |
| fish | Fillets | 400 | 3 |
| | | 500 | 3 |
| | | 600 | 3 |
| | | 700 | 3 |
| | | 800 | 3 |
| | | 900 | 3 |
| | | 1000 | 3 |
| | Steaks | 400 | 6 |
| | | 500 | 6 |
| | | 600 | 7 |
| | | 700 | 7 |
| | | 800 | 7 |
| | | 900 | 9 |
| | | 1000 | 9 |
| carrot | slices | 362 | 7 |
| | | 503 | 7 |
| | | 988 | 7 |
| | Whole | 3 (266 g) | 15 |
| | | 6 (437 g) | 15 |
| | | 9 (528 g) | 15 |
| zucchini | whole | 2 (440 g) | 7 |
| | | 4 (766 g) | 7 |
| | | 6 (1020 g) | 7 |
| | pieces | 318 | 7 |
| | | 524 | 7 |
| | | 1106 | 7 |
| potato | pieces | 208 | 14 |
| | | 482 | 14 |
| | Whole | 671 | 14 |
| | | 2 (234 g) | 28 |
| | | 5 (482 g) | 28 |
| | | 8 (608 g) | 28 |
| . . . | . . . | . . . | . . . |

The invention claimed is:

1. A control device for a cooking appliance comprising:
a control unit of a heating component, the control unit being arranged to define a cooking cycle comprising a sequential series of combinations of predetermined cooking parameters and being arranged to determine at least one combination of predetermined cooking parameters as a function at least of the specific surface area of at least one ingredient of a plurality of ingredients of a predetermined recipe inserted into a cooking chamber of the cooking appliance, wherein the plurality of ingredients includes at least a first ingredient cooked according to a first manner and a second ingredient cooked according to a second manner different from the first manner,
wherein, said control unit being arranged to estimate the specific surface area from descriptive parameters of the at least one ingredient from among the plurality of ingredients of the predetermined recipe,
wherein said control unit comprises:
a database comprising:
a first group of predetermined recipes comprising a plurality of predetermined ingredients designed to be inserted into the cooking chamber of the cooking appliance, and
a second group of the descriptive parameters for at least one ingredient from among the plurality of predetermined ingredients of the recipes of the first group,
a user interface comprising:
first means for selecting a predetermined recipe from the first group of the database, and
second means for selecting the descriptive parameters from the second group of the database of the least one ingredient from among the plurality of ingredients of the selected predetermined recipe from the first group.

2. The device according to claim 1, wherein the control unit is arranged to determine the at least one combination of cooking parameters taking into account the type of the at least one ingredient from among the plurality of ingredients of the predetermined recipe.

3. The device according to claim 1, wherein the user interface comprises display means of a graphic type with a liquidcrystal screen, and the first and/or second selection means comprise a rotary selection knob.

4. The device according to claim 1, wherein the descriptive parameters of the at least one ingredient from among the plurality of ingredients of the predetermined recipe comprise the shape and/or size of the at least one ingredient.

5. The device according to claim 1, wherein the descriptive parameters of the at least one ingredient from among the plurality of ingredients of the predetermined recipe comprise the quantity of ingredients.

6. The device according to claim 1, wherein the descriptive parameters of the at least one ingredient from among the plurality of ingredients of the predetermined recipe comprise the state of the at least one ingredient.

7. The device according to claim 1, wherein the user interface comprises third means for selecting the user's preferences from a third group of the database, the control unit being arranged to make the determination of a combination of predetermined cooking parameters also as a function of the preferences selected by the user.

8. The device according to claim 1, wherein the database comprises a fourth group of cooking cycles comprising a sequential series of predetermined combinations of predetermined cooking parameters, each predetermined combination of the series of cooking parameters being associated with possible combinations between:
the predetermined recipes of the first group, with
the descriptive parameters of the at least one ingredient from among the plurality of ingredients of the predetermined recipes of the second group, and with
if applicable, the preferences from the third group,
the determination of the cooking cycle by the control unit comprising selecting a cooking cycle from the fourth group as a function of the selection by the user of:
a predetermined recipe from the first group,
descriptive parameters from the second group of the database of the at least one ingredient from among the plurality of ingredients of the selected predetermined recipe from the first group, and, if applicable,
preferences selected from the third group.

9. A cooking appliance comprising a cooking chamber designed to receive a plurality of ingredients of a predetermined recipe, a heating component for heating the cooking chamber, and a control device according to claim 1.

10. A cooking assembly comprising a cooking appliance having a cooking chamber designed to receive a plurality of ingredients of a predetermined recipe, a heating component for heating the cooking chamber, and first communication means, and a control device according to claim 1, said device also comprising second communication means arranged to communicate with the first wireless communication means of the cooking appliance.

11. A method for cooking at least one ingredient from among a plurality of ingredients of a predetermined recipe in a cooking appliance according to claim 9, comprising a step of determining at least one combination of predetermined cooking parameters as a function of the specific surface area of the at least one ingredient from among the plurality of ingredients of the predetermined recipe inserted into the cooking chamber of the cooking appliance, said specific surface area being estimated from descriptive parameters of the at least one ingredient from among the plurality of ingredients of the predetermined recipe.

12. A cooking method comprising the following steps:
- (a): selecting a predetermined recipe from the first group of a database using first selection means,
- (b): selecting, from a second group of the database, descriptive parameters of at least one ingredient from among the plurality of ingredients of the predetermined recipe selected from the first group using second selection means,
- (c): carrying out the method according to claim 11.

13. The method for cooking a plurality of ingredients of a recipe according to claim 12, also comprising the following steps:
- (d): starting a predetermined cooking cycle comprising a sequential series of combinations of predetermined cooking parameters,
- (e): indicating one or more first ingredients of the selected recipe to be inserted into the cooking chamber as a function of the selected descriptive parameters,
- (f): inserting one or more first ingredients of the selected recipe into the cooking chamber according to the selected descriptive parameters,
- (g): applying a first sequence of the sequential series of the predetermined combination of the cooking parameters comprised in the predetermined cooking cycle so as to precook said first ingredient(s).

14. The cooking method according to claim 13, also comprising the following steps:
- (h): sequentially indicating one or other ingredient(s) of the selected recipe to be inserted into the cooking chamber as a function of the selected descriptive parameters, and
- (i): inserting the other ingredient(s) indicated in the selected recipe into the cooking chamber as a function of the selected descriptive parameters,
- (j): applying another sequence of the sequential series of the predetermined combination of cooking parameters comprised in the cooking cycle so as to cook the ingredient(s) already located in the cooking chamber and said other ingredient(s),
- (k): if applicable, restarting at step comprising sequentially indicating one or other ingredient(s) of the selected recipe to be inserted into the cooking chamber as a function of the selected descriptive parameters until all of the foods in the recipe have been inserted and the last sequence of the sequential series of the predetermined combination of cooking parameters of the predetermined cooking cycle has been completed.

* * * * *